United States Patent
Komar et al.

(10) Patent No.: US 8,561,011 B2
(45) Date of Patent: Oct. 15, 2013

(54) TASK MANAGEMENT FOR CHANGES TO SHARED ARTIFACTS

(75) Inventors: Paul Komar, Lexington, MA (US); Maneesh Mehra, Westford, MA (US)

(73) Assignee: International Business Machines Corporation, Armonk, NY (US)

( * ) Notice: Subject to any disclaimer, the term of this patent is extended or adjusted under 35 U.S.C. 154(b) by 301 days.

(21) Appl. No.: 13/157,661

(22) Filed: Jun. 10, 2011

(65) Prior Publication Data

US 2012/0317537 A1 Dec. 13, 2012

(51) Int. Cl.
  *G06F 9/44* (2006.01)
  *G06F 9/46* (2006.01)
  *G06Q 10/00* (2012.01)

(52) U.S. Cl.
  USPC .......................... 717/101; 705/7.13; 718/100

(58) Field of Classification Search
  USPC ........ 717/101–103, 120–123; 705/7.13–7.26; 718/100–108
  See application file for complete search history.

(56) References Cited

U.S. PATENT DOCUMENTS

| | | | |
|---|---|---|---|
| 7,159,206 B1 * | 1/2007 | Sadhu et al. ................... | 717/101 |
| 7,263,183 B1 * | 8/2007 | Klein et al. ............... | 379/265.09 |
| 7,330,822 B1 * | 2/2008 | Robson et al. ................ | 705/7.15 |
| 7,496,912 B2 | 2/2009 | Keller et al. | |
| 7,735,062 B2 | 6/2010 | de Seabra et al. | |
| 7,765,520 B2 | 7/2010 | Wagner et al. | |
| 7,873,153 B2 * | 1/2011 | Bukovec et al. ......... | 379/220.01 |
| 7,904,322 B2 * | 3/2011 | Gauger ........................ | 705/7.13 |
| 8,037,088 B2 * | 10/2011 | Chatterjee et al. ............ | 707/769 |
| 8,060,855 B2 * | 11/2011 | Hegde et al. ................... | 717/103 |
| 2002/0007300 A1 * | 1/2002 | Slatter ............... | 705/9 |
| 2002/0078007 A1 * | 6/2002 | Herrero ................ | 707/1 |
| 2005/0022198 A1 * | 1/2005 | Olapurath et al. ............ | 718/102 |
| 2005/0114475 A1 * | 5/2005 | Chang et al. .................. | 709/220 |
| 2005/0261787 A1 | 11/2005 | Plante | |
| 2006/0064634 A1 * | 3/2006 | Dettinger et al. ............. | 715/511 |
| 2006/0218521 A1 * | 9/2006 | Hagstrom et al. ............ | 717/101 |
| 2007/0067772 A1 * | 3/2007 | Bustamante ................... | 718/100 |
| 2007/0168918 A1 * | 7/2007 | Metherall et al. ............. | 717/101 |
| 2007/0185754 A1 * | 8/2007 | Schmidt ............................ | 705/9 |
| 2007/0185873 A1 * | 8/2007 | Muller et al. ..................... | 707/9 |
| 2007/0186214 A1 * | 8/2007 | Morgan ........................ | 718/100 |
| 2007/0192155 A1 * | 8/2007 | Gauger ............................ | 705/8 |
| 2007/0192156 A1 * | 8/2007 | Gauger ............................ | 705/8 |
| 2007/0266133 A1 * | 11/2007 | Bukovec et al. .............. | 709/223 |
| 2007/0282657 A1 | 12/2007 | Hupfer et al. | |
| 2007/0282660 A1 * | 12/2007 | Forth ................................ | 705/9 |

(Continued)

OTHER PUBLICATIONS

Jalote et al., "Assigning tasks in a 24-h software development model," 2005, Elsevier Inc., p. 904-911.*

(Continued)

*Primary Examiner* — Qing Chen
(74) *Attorney, Agent, or Firm* — Cuenot, Forsythe & Kim, LLC (57) ABSTRACT

A method of task management for shared artifacts can include detecting a change tag associated with a software artifact and determining, via a processor, each software artifact that is dependent upon the software artifact. A task associated with each dependent software artifact can be generated. Each task can specify a need for a modification to the associated software artifact. A responsible party for each dependent software artifact can be determined. Each task can be automatically assigned to the responsible party for the software artifact associated with the task.

25 Claims, 4 Drawing Sheets

(56) References Cited

U.S. PATENT DOCUMENTS

| | | | | |
|---|---|---|---|---|
| 2007/0288292 | A1* | 12/2007 | Gauger | 705/9 |
| 2008/0120591 | A1 | 5/2008 | Clemm et al. | |
| 2008/0301296 | A1* | 12/2008 | York | 709/225 |
| 2009/0094572 | A1 | 4/2009 | Hegde et al. | |
| 2009/0265634 | A1* | 10/2009 | Beringer et al. | 715/733 |
| 2009/0293064 | A1 | 11/2009 | Behrendt et al. | |
| 2010/0161645 | A1 | 6/2010 | Chatterjee et al. | |
| 2012/0042003 | A1* | 2/2012 | Goetz et al. | 709/203 |

OTHER PUBLICATIONS

Noll, J., et al., "Supporting Software Development in Virtual Enterprises," [online] J. of Digital Information, vol. 1, No. 4, Jan. 14, 1999, retrieved from the Internet: <http://citeseerx.ist.psu.edu/viewdoc/download? doi=10.1.1.29.1736&rep=rep1&type=pdf>.

Grundy, J., et al., "Inconsistency Management for Multiple-View Software Development Environments," IEEE Trans. on Software Engineering, vol. 24, No. 11, pp. 960-981, Nov. 1998.

* cited by examiner

TASK MANAGEMENT FOR CHANGES TO SHARED ARTIFACTS

BACKGROUND

One or more embodiments disclosed within this specification relate to task management. More particularly, one or more embodiments relate to task management in relation to shared artifacts.

Modern software development requires a multi-faceted and layered approach. Software systems developed using modern software development practices are typically highly structured and highly complex. A complex software system can be thought of in terms of the constituent parts of that system. The constituent parts, referred to as software artifacts, come together to coalesce into the final software system.

As expected with highly complex systems, software artifacts are usually highly inter-related. Most software artifacts of a given software system will rely upon one or more other software artifacts. This interdependency among software artifacts requires a high level of coordination among members of the development team. In this regard, it is useful for members of the development team to know when particular software artifacts that are heavily relied upon by other software artifacts are undergoing change, whether that change is characterized as minor or significant.

BRIEF SUMMARY

One or more embodiments disclosed within this specification relate to task management and, more particularly, to task management in relation to shared artifacts.

An embodiment can include a method of task management for shared artifacts. The method can include detecting a change tag associated with a software artifact and determining, via a processor, each software artifact that is dependent upon the software artifact. A task associated with each dependent software artifact can be generated. Each task can specify a need for a modification to the associated software artifact. A responsible party for each dependent software artifact can be determined. Each task can be automatically assigned to the responsible party for the software artifact associated with the task.

Another embodiment can include a method of task management for shared artifacts. The method can include detecting a change tag associated with each of a plurality of software artifacts and determining, via a processor, each software artifact that is dependent upon at least one software artifact of the plurality of software artifacts. The method further can include generating a task associated with each software artifact associated with a change tag and generating a task associated with each dependent software artifact. Each task specifies a need for a modification to the associated software artifact. The method also can include determining a responsible party for each software artifact and automatically assigning each task to the responsible party for the software artifact associated with the task.

Another embodiment can include a system including a computer readable storage medium having computer readable program code embodied therewith and a processor coupled to the computer readable storage medium. Responsive to executing the computer readable program code, the processor can be configured to execute operations including detecting a change tag associated with a software artifact, determining each software artifact that is dependent upon the software artifact, and generating a task associated with each dependent software artifact, wherein each task specifies a need for a modification to the associated software artifact. The processor can be further configured to perform operations including determining a responsible party for each dependent software artifact and automatically assigning each task to the responsible party for the software artifact associated with the task.

Another embodiment can include a computer program product for task management. The computer program product can include a computer readable storage medium having computer readable program code embodied therewith. The computer readable program code can include computer readable program code configured to detect a change tag associated with a software artifact, computer readable program code configured to determine each software artifact that is dependent upon the software artifact, and computer readable program code configured to generate a task associated with each dependent software artifact, wherein each task specifies a need for a modification to the associated software artifact. The computer readable program code also can include computer readable program code configured to determine a responsible party for each dependent software artifact and computer readable program code configured to automatically assign each task to the responsible party for the software artifact associated with the task.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list)

of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

One or more embodiments disclosed within this specification relate to task management and, more particularly, to task management in relation to shared artifacts. In accordance with the inventive arrangements disclosed within this specification, a plan specifying an ordering of tasks to be performed can be determined. The plan can be determined according to intentions expressed by users to change software artifacts of a software system undergoing development. Intentions to change software artifacts, or portions thereof, can be referred to, and manifested within a task management system as electronic records called change tags. The association of a tag, e.g., a change tag, with a software artifact within the task management system can be referred to as "tagging" the software artifact.

Tasks can be generated based upon change tags that have been associated with software artifacts. The tasks generated in response to change tags can be assigned to various entities, e.g., responsible parties, as well as sequenced among themselves. Conflicting change tags and/or conflicting tasks can be sequenced as well. For example, policies can be determined and applied that govern aspects of task management such as conflict resolution, weighting or prioritization of change tags and/or tasks, and the conditions under which tasks are to be grouped, if at all, e.g., merged or the like.

The one or more embodiments disclosed herein facilitate the generation of tasks and the sequencing of such tasks into a plan. The resulting plan allows development personnel to coordinate activities to complete tasks to further a process such as software development. In this manner, personnel can interact with the task management system as described within this specification rather than interacting directly with other personnel. Sequencing tasks to develop a plan can reduce and/or eliminate redundant work, e.g., rework, that can occur when both minor and major changes may be required to one or more different software artifacts of the software system being developed.

Figure 1:
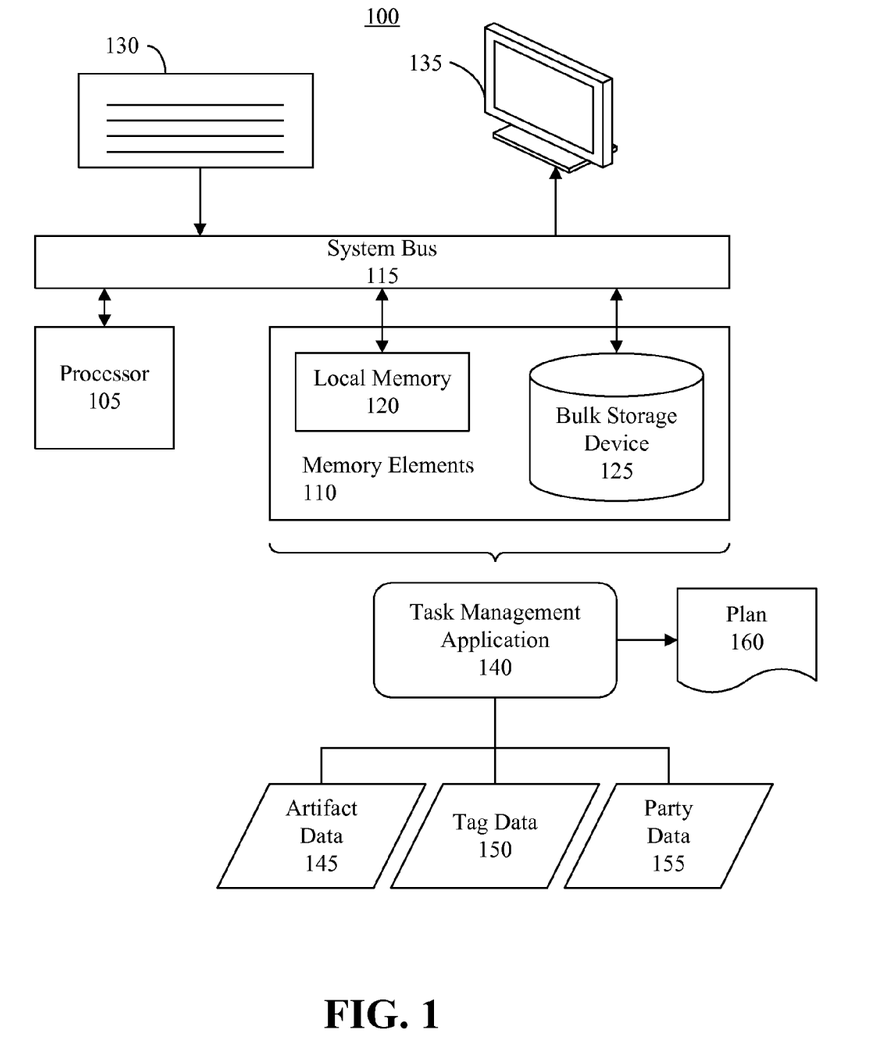
FIG. 1 is a first block diagram illustrating a system for task management in accordance with an embodiment disclosed within this specification.

FIG. 1 is a first block diagram illustrating a system 100 for task management in accordance with an embodiment disclosed within this specification. System 100 can include at least one processor 105 coupled to memory elements 110 through a system bus 115. As such, system 100 can store program code within memory elements 110. Processor 105 can execute the program code accessed from memory elements 110 via system bus 115. In one aspect, for example, system 100 can be implemented as a computer that is suitable for storing and/or executing program code. It should be appreciated, however, that system 100 can be implemented in the form of any system comprising a processor and memory that is capable of performing the functions described within this specification, e.g., a desktop computer, a server, or the like.

Memory elements 110 can include one or more physical memory devices such as, for example, local memory 120 and one or more bulk storage devices 125. Local memory 120 refers to random access memory or other non-persistent memory device(s) generally used during actual execution of the program code. Bulk storage device(s) 125 can be implemented as a hard drive or other persistent data storage device.

System 100 also can include one or more cache memories (not shown) that provide temporary storage of at least some program code in order to reduce the number of times program code must be retrieved from bulk storage device 125 during execution.

Input/output (I/O) devices such as a keyboard 130, a display 135, and a pointing device (not shown) optionally can be coupled to system 100. The devices can be coupled to system 100 either directly or through intervening I/O controllers. Network adapters also can be coupled to system 100 to enable system 100 to become coupled to other systems, computer systems, remote printers, and/or remote storage devices through intervening private or public networks. Modems, cable modems, and Ethernet cards are examples of different types of network adapters that can be used with system 100.

As pictured in FIG. 1, memory elements 110 can store a task management application 140 and corresponding data illustrated as artifact data 145, tag data 150, and party data 155. Task management application 140, being implemented in the form of executable program code, can be executed by system 100. Task management application 140 can perform functions including, but not limited to, change tag assignment, change tag detection with respect to software artifacts and/or portions thereof, task generation from change tags, and/or task sequencing to develop a plan.

It should be appreciated that while task management application 140 can be executed within system 100, in another embodiment, task management application 140 can be executed across a plurality of different computing systems as a distributed system. Further, data such as artifact data 145, change data 150, and party data 155 can be stored in the form of, or implemented as, one or more data sources, e.g., databases, tables, flat files, or the like, existing within system 100 or existing within one or more other computing systems, data storage nodes, and/or the like that are accessible by task management application 140 through suitable network connections or communication links.

Artifact data 145 can specify one or more software artifacts or a list of the software artifacts, e.g., references to software artifacts stored elsewhere. A software artifact can refer to a computer resource such as a programmatic computer resource. For example, a software artifact can represent a portion of program code, whether source code, interpreted code, compiled code, etc. In general, a software artifact can refer to any portion of program code that can be utilized within or exist as part of a larger software system.

One example of a software artifact can be an interface as is commonly used in the context of Java programming. Each interface can have a contract that specifies the way in which the interface is to behave and interact with other software artifacts, e.g., interfaces. Continuing, an example of a part of a software artifact can be a class method, or simply a method. In this manner, program code can have a defined hierarchy with a plurality of different levels. For example, one or more methods can be part of a software artifact such as an interface. One or more software artifacts, e.g., interfaces, can form a next higher level within the hierarchy such as a component. Interfaces are provided as one example of a software artifact. Similarly, interfaces, methods, and components are provided as examples to illustrate a hierarchy of software or program code. It should be appreciated that these examples are not intended to limit the one or more embodiments disclosed within this specification and, as such, other types of software artifacts and program code hierarchies can be used depending upon the particular program code used to implement the software system.

In addition to the software artifacts or list of software artifacts, artifact data 145 further can store dependency information for the software artifacts. More particularly, artifact data 145 can store information that specifies which software artifacts utilize or rely upon which other software artifacts. For example, one software artifact, e.g., a producer, can produce output that is utilized by one or more other software artifacts, e.g., consumers. This type of dependency among the various software artifacts, or parts of software artifacts, can be annotated or specified within software artifacts 145.

Tag data 150 can specify one or more change tags. A change tag can embody a record of intention created by a user in reference to one or more software artifacts or portions of software artifacts. A user, for example, can create a change tag and associate that change tag with a particular software artifact or portion of the software artifact. The creation and association of a change tag with a software artifact or portion thereof indicates that the user that created the change tag intends on modifying some aspect of the software artifact associated with the change tag. In this regard, each change tag can be associated with, or specify, a particular software artifact or portion of a software artifact.

Each change tag within tag data 150 can have a particular type. In an embodiment, change tags can belong to one of two distinct and different types. A first type of change tag can be referred to as a maintenance type of change tag or a "maintenance change tag." A second type of change tag can be referred to as a breaking type of change tag or a "breaking change tag."

A maintenance change tag can embody an intent to change a selected software artifact that does not change the manner in which other artifacts interact with the selected software artifact. For example, a maintenance change tag, as applied to a selected software artifact, signifies that the selected software artifact is to undergo some sort of modification, e.g., an internal change to the selected software artifact. The interface that other software artifacts use to communicate with the selected software artifact does not change despite the internal changes to the selected software artifact.

In another example, a maintenance change tag can embody an intent to change a selected software artifact that is solely a consumer type of software artifact. In that case, since the selected software artifact does not present an interface that is accessed by any other software artifact of the system, the type or extent of the change does not affect any other software artifacts in the system. As such, any sort of change to a software artifact that is strictly a consumer can be referred to as a maintenance change tag.

A breaking change tag embodies an intent to change a selected software artifact that results in a change in the way that other software artifacts interact or communicate with the selected software artifact. For example, a breaking change tag, as applied to a selected software artifact, signifies that the selected software artifact is to undergo some sort of modification. The interface that other software artifacts use to communicate with the selected software artifact, however, does, or will, change as a result of the modification. The breaking change tag indicates that any software artifacts that interact, or communicate, with the selected software artifact, e.g., dependent software artifacts, must also change or adapt in order to continue to communicate with the selected software artifact.

Party data 155 can store a listing of one or more different parties. Each party can be a person, a group of two or more people such as a team or an entity made up of one or more people. In this regard, each party can be an identity for a person or group of people to which a task can be assigned.

Each party specified in party data 155 can be associated with one or more software artifacts. Each party specified within party data 155 can be said to "own" or be "responsible" for the one or more artifacts associated with that party. In this regard, a party can be referred to as the responsible party for any software artifact associated with that party. For example, the responsible party of a software artifact can be responsible for maintaining and developing, e.g., implementing the tasks relating to, the software artifacts owned by that party.

In general, task management application 140 can access artifact data 145, tag data 150, and party data 155 to determine which artifacts have been associated with change tags. Task management application 140 can perform functions such as generating tasks responsive to detecting change tags associated with software artifacts, assign the generated tasks to the appropriate responsible party, detect conflicts among change tags and/or the resulting tasks, sequence the tasks into a plan, and resolve conflicts according to weights developed by task management application 140 and one or more policies, e.g., rules, that determine the prioritization, including conflict resolution, among tasks. Task management application 140 then can output a plan 160 specifying the sequencing of tasks that is developed.

Figure 2:
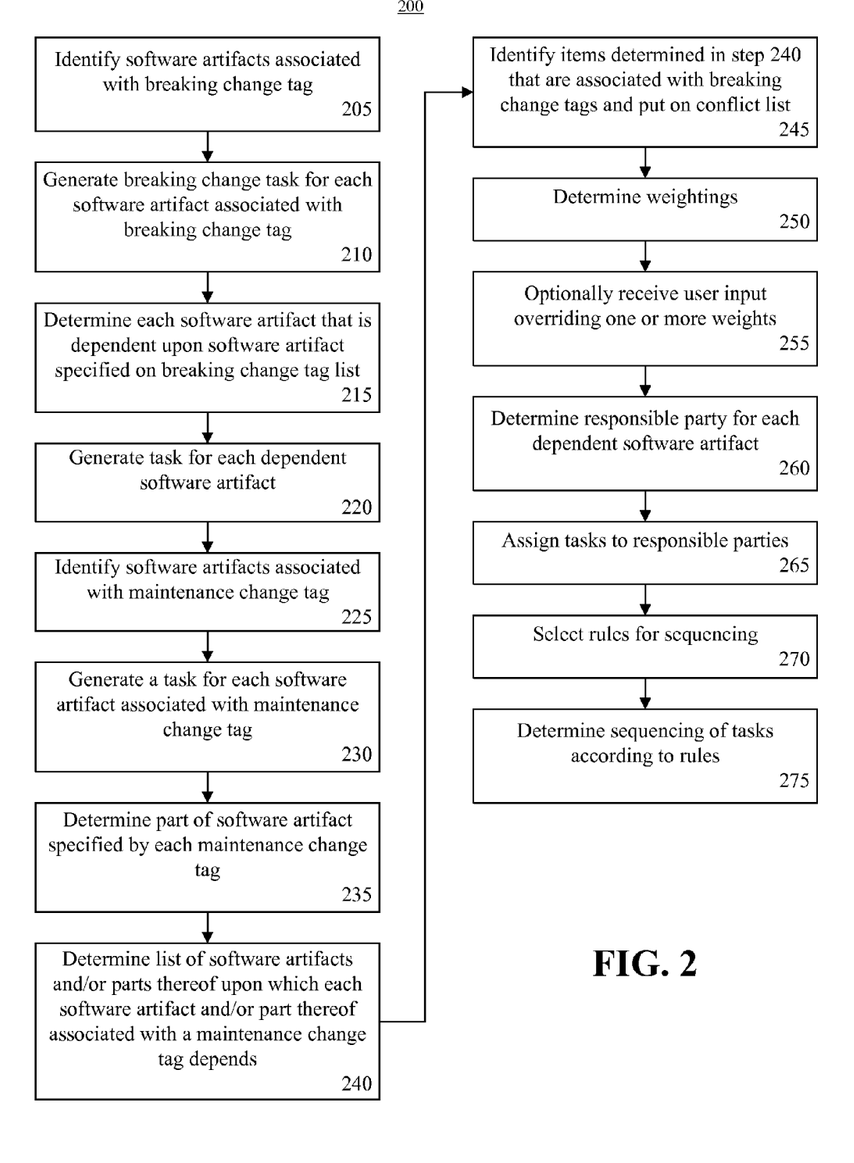
FIG. 2 is a flow chart illustrating a method of task management in accordance with another embodiment disclosed within this specification.

FIG. 2 is a flow chart illustrating a method 200 of task management in accordance with another embodiment disclosed within this specification. More particularly, method 200 illustrates an embodiment in which tasks can be automatically generated, assigned to responsible parties, and sequenced into a plan to be followed by the responsible parties that form the development team. Method 200 can be performed by a system such as system 100 as illustrated with reference to FIG. 1. Method 200 can begin in a state where one or more developers have tagged software artifacts of a software system being developed. Such tags or tagging inputs can be provided to the system.

Beginning in step 205, the system can identify and select software artifacts associated with a breaking change tag. The system can examine the artifact data and the tag data and identify each software artifact that is associated with a breaking change tag. For example, in step 205, the system can generate a list of breaking change tags called the breaking change tag list. In step 210, the system can automatically generate a breaking task for each breaking change tag. Each breaking task that is generated is correlated with the particular breaking change tag that causes generation of the breaking task and the software artifact with which that breaking change tag is associated.

In an embodiment, tasks can belong to one of a plurality of different types. For example, the system can automatically generate a breaking type of task relating to each software artifact tagged with a breaking change tag. The system can automatically generate an adoption task for each software artifact that is dependent upon a software artifact tagged with a breaking change tag. The system can automatically generate a maintenance task associated with each software artifact tagged with a maintenance change tag. It should be appreciated that the tasks that are generated can preserve any dependencies that are also reflected within the underlying change tags that prompted generation of the respective tasks. For example, an adoption task that is generated for a first software artifact that is dependent upon a second software artifact tagged with a breaking change tag will be dependent upon the breaking task of the second software artifact just as the operation of the first software artifact depends upon the operation of the second software artifact.

In step 215, the system can determine each software artifact that is dependent upon a software artifact specified in the breaking change tag list. Each software artifact that is dependent upon a software artifact in the breaking change tag list, for example, can include a method that references or calls a method of one or more software artifacts in the breaking change tag list. In step 220, the system can automatically generate a task for each dependent software artifact identified in step 215. For example, the system can generate an adoption type of task for each of the software artifacts that depends upon a software artifact tagged with a breaking change tag. As noted, each adoption task for a selected software artifact will reflect a dependency upon the breaking task of the software artifact upon which the selected software artifact depends.

In step 225, the system can identify each software artifact associated with at least one maintenance change tag. The system can examine the artifact data and the tag data and identify each software artifact that is associated with a maintenance change tag. For example, in step 225, the system can generate a list of maintenance change tags called the maintenance change tag list. In step 230, the system can generate a task, e.g., a maintenance task, for each software artifact that is in the maintenance change tag list step 235, the system can determine the software artifact, or part thereof, specified by each maintenance change tag. For example, for each software artifact associated with a maintenance change tag, the system can identify or determine the part of that software artifact that is specified by the maintenance change tag. In step 240, the system can determine a list of software artifacts and/or parts of software artifacts upon which each software artifact, or part thereof, that is associated with a maintenance change tag depends. More particularly, for each software artifact and/or part of a software artifact identified in step 235, the system can determine the software artifacts and/or parts of software artifacts upon which those items identified in step 235 depend.

In step 245, the system can determine the items identified in step 240 that are also associated with a breaking change tag and place the identified items, whether software artifacts or parts of software artifacts, on a conflict list. The resulting conflict list generated in step 245 specifies parts of software artifacts, e.g., producers, that are tagged with breaking change tags and are also depended upon by other software artifacts (e.g., consumers or parts thereof), wherein the other (consumer) software artifacts have been tagged with a maintenance change tag.

In step 250, the system can automatically determine a weighting or weight for software artifacts, parts of software artifacts, and/or tasks that are generated. The system can determine weights for one or more or all (e.g., each) software artifact or task that is generated. In another aspect, the system further can generate weights for entries, e.g., software artifacts or parts thereof, placed on the conflict list. The weights that are determined can be used to sequence the various tasks and further to resolve conflicts among entries on the conflict list. In general, weights can be viewed as data that is generated automatically by the system and associated with software artifacts, parts of software artifacts, and/or tasks. Rules and/or policies are considered logic that exists as part of the system.

Each weight can be specified as a value or parameter indicating the relative importance of that software artifact, part of a software artifact, or task relative to each other software artifact, part of a software artifact, or task. For example, regarding software artifacts, including those placed on the conflict list, the system can determine a weight as the number of change tags associated with each individual software artifact or individual part of a software artifact as the case may be. The weight, for example, can be proportional to the number of change tags associated with each software artifact or part. In another example, each weight can be determined as a function of the different types of change tags associated with the software artifact or parts thereof. For instance, the number of each type of change tag associated with a particular software artifact can be multiplied by a selected multiplier specific to each type of change tag with the results being summed on a per software artifact or part basis.

Scheduling can be prioritized according to weighting with items of greater weight being scheduled earlier than items of lower weight. Further, conflicts can be resolved in favor of the particular part, or software artifact to which the part belongs, that is given the greatest weight by the system. For example, tasks corresponding to artifacts or parts thereof with greater weight can be scheduled earlier than tasks corresponding to artifacts or parts thereof with lesser weight. In another example, conflicts can be resolved in favor of the particular part, or software artifact to which the part belongs, that has the larger, e.g., greatest, weight where weighting is determined according to number of change tags of a particular type, e.g., the most breaking change tags or the most maintenance change tags. The weighting described can be used to help sequence tasks when generating a plan. A variety of different rules for sequencing tasks can be used in combination with the weights, at least in part, to schedule tasks and resolve conflicts between two or more tasks.

In another aspect, weights can reflect timeliness in which modifications to software artifacts are to be effectuated by the responsible party. For example, when creating a change tag and associating the change tag with a particular software artifact, a parameter can be specified that is indicative of when the modification should be performed, e.g., where parameters indicate "urgent," "not urgent," "optional" or the like. The parameter specified in the change tag can be translated into a weight or used as a parameter in calculating weights, e.g., as a parameter of a function used to determine weighting. In another example, the type of change tag that is created can be used by the system to determine a measure of timeliness that can be incorporated into the weights that are determined. For instance, one or more change tags, e.g., breaking change tags, can be considered "urgent" while others are considered "not urgent." Further, maintenance change tags can be considered "optional." More urgent measures of timeliness can contribute more to a weight than, for example, those that are not urgent or optional.

In still another aspect, weights can reflect the size of the modification that is to be performed. For example, particular types of change tags, e.g., breaking change tags and/or adoption change tags, can have a default value such as "large" or "significant" indicating that the modifications to be made are anticipated to be significant or large. Other change tags, e.g., maintenance change tags, can have default values indicating lesser size or significance. Change tags considered to require more significant effort or work can contribute more to a weight than those considered to require less effort or work. It should be appreciated that despite the manner in which weights are determined for software artifacts, such weights can be carried forward or attributed to the tasks generated for the software artifact. Thus, prioritization can be performed with respect to software artifacts, parts of software artifacts, change tags associated with software artifacts or parts thereof, or any tasks generated from change tags.

In step 255, the system optionally can receive user input overriding one or more weights determined by the system in step 250. For example, a user can choose to override the default weighting determined by the system for one or more tasks. In an embodiment, users can be restricted to overriding the weight for tasks, e.g., the weight for change tags from which a particular task was generated, for which the user is the responsible party. In another embodiment, the user can override tasks for which the user is the responsible party and for tasks for which the user is not the responsible party.

In step 260, the system can determine a responsible party for each software artifact and/or part of each software artifact that is associated with a task. In step 265, the system can assign tasks to responsible parties as determined in step 260. For example, each task that is generated corresponds to a particular software artifact or a particular part of a software artifact. Any tasks associated with the software artifact or part thereof can be assigned to the responsible party for the software artifact or part.

In step 270, the system can select or determine the particular rules to be used in sequencing the tasks. In an embodiment, one or more rules can be specified by users of the system to inform the system as to how tasks are to be sequenced. In general, rules that are applied by the system schedule those tasks that have greater weight, or are associated with software artifacts or parts thereof with greater weight prior to those that have, or are associated with lesser weight. Examples of additional rules that can be applied or activated by users within the system can include, but are not limited to, generating breaking tasks for breaking change tags, generating adoption tasks for software artifacts dependent upon software artifacts associated with breaking tasks, and generating maintenance tasks for maintenance change tags. It should be appreciated that, for purposes of description, these options were considered to be activated else steps 210, 220, and 230 would not have been performed within FIG. 2.

Further examples of rules relate to various task processing techniques. These task processing techniques can include merging and/or splitting tasks. For example, one processing technique can merge maintenance tasks with adoption tasks in an attempt to amortize the cost of adoption task(s) across the maintenance tasks to reduce work. Other examples can include scheduling larger tasks earlier than smaller tasks, e.g., scheduling breaking tasks or adoption tasks earlier than maintenance tasks for the same software artifacts, scheduling smaller tasks prior to larger tasks, e.g., scheduling breaking tasks or adoption tasks later than maintenance tasks.

In another example, one or more rules can be specified that seek to generate fewer tasks that are larger in scope. The system can categorize the software artifacts into groups or sets of software artifacts. As noted, software artifacts can be organized into a hierarchical structure. For example, each software artifact can include, or be formed of, one or more parts, where each part can be considered a child of a software artifact. Each software artifact itself can be considered a child of a next higher level node in a software hierarchy called a component.

With this in mind, software artifacts can be organized into sets where each software artifact within a same set belongs to a level or node in the hierarchy of the software system being developed. For example, software artifacts can be organized into sets where each software artifact in the same set belongs to a same component. Any tasks of a particular type, e.g., adoption, generated for artifacts of, or within, a same component can be merged into a single larger task of that type. In another example, tasks generated from a level or node in the hierarchy, e.g., software artifacts of a same component or the same software artifacts, can be merged into a plurality of tasks where each task is generated from "N" tasks that are combined, where N is an integer value greater than 2 which can be selected by a user as a parameter of the system. Thus, each resulting task is generated from "N" tasks at the same level in the hierarchy.

In still another example, two or more tasks associated with a same software artifact can be merged under selected conditions. For instance, the type of each respective task associated with a same software artifact can be determined. Responsive to determining that two or more tasks associated with a same software artifact are of a same type, the tasks can be merged.

Another task processing technique can seek to generate a larger number of tasks where each generated task is smaller in scope. For example, rather than generating a task for each software artifact that has a dependency on a part that is associated with a breaking change tag, the system can generate a task for each affected part within each affected software artifact.

As tasks are combined, the responsible party can remain the same. For example, in an embodiment, only tasks having the same responsible party can be combined. In another example, a responsible party for a task that is split will be the responsible party for each resulting task.

In step 275, the system can determine a plan specifying a sequencing of tasks according to the particular rules in effect as described and also according to the weights that have been determined or provided by user(s). The resulting sequencing of tasks referred to as the plan allows a team to coordinate the completion of the tasks associated with change tags that conflict with one another by interacting with the system as opposed to each other.

The system can be configured to create plans that reduce or eliminate the rework that can occur when adoption and maintenance tasks overlap for one or more artifacts. The resulting plan can be implemented by the various responsible parties, e.g., the development team. Progress relating to implementation and completion of assigned tasks can be published or displayed, for example, via a shared site or other collaborative application. Accordingly, though each responsible party is assigned tasks by the system and interacts with the system, each responsible party still can view progress of each other responsible party in terms of task completion and scheduling. Further, the system can enforce the plan by preventing one from marking task B complete prior to marking task A complete when task A is scheduled prior to task B in the plan, wherein task B is dependent upon completion of task A.

Figure 3:
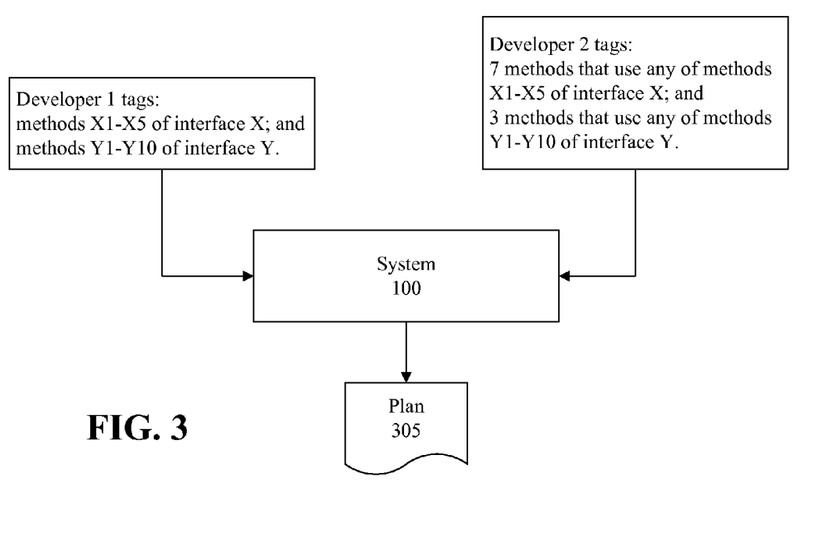
FIG. 3 is a system flow diagram illustrating an exemplary use case in accordance with another embodiment disclosed within this specification.

FIG. 3 is a system flow diagram illustrating an exemplary use case in accordance with another embodiment disclosed within this specification. FIG. 3 illustrates an example of a use case involving two different developers denoted as developer 1 and developer 2. As shown, developer 1 tags 5 different methods of interface X. Developer 1 tags methods X1, X2, X3, X4, and X5 denoted as X1-X5 interface X. Developer 1 further tags 10 different methods of interface Y. In particular, developer 1 tags methods Y1, Y2, Y3, Y4, Y5, Y6, Y7, Y8, Y9, and Y10, denoted as Y1-Y10, of interface Y.

Developer 1 can be referred to as a producer in that the various interfaces for which developer 1 is responsible are producers. The various interfaces tagged by developer 1 produce output that is consumed by others, e.g., the methods for which developer 2 is responsible. In this regard, developer 2 can be referred to as a consumer in that the methods for which developer 2 is responsible are consumers. The methods tagged by developer 2 consume, or depend upon, output generated by the producer methods.

Developer 2 tags 7 different methods that utilize any of methods X1-X5 interface X. Further, developer 2 tags 3 different methods that utilize any of methods Y1-Y10 of interface Y. The methods tagged by developer 2 are to be modified in the same design iteration as the methods tagged by developer 1. Accordingly, development efforts must be coordinated through the generation and sequencing of tasks.

Figure 4:
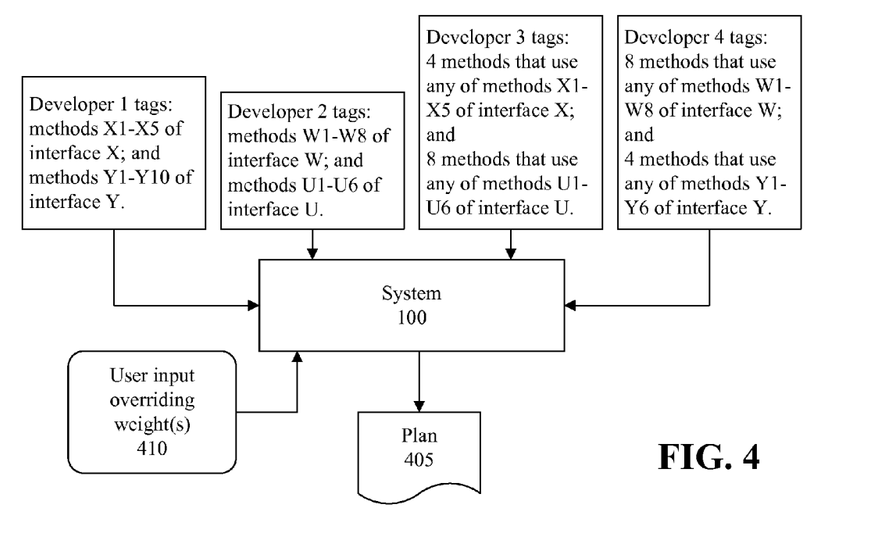
FIG. 4 is a system flow diagram illustrating an exemplary use case in accordance with another embodiment disclosed within this specification.
Figure 5:
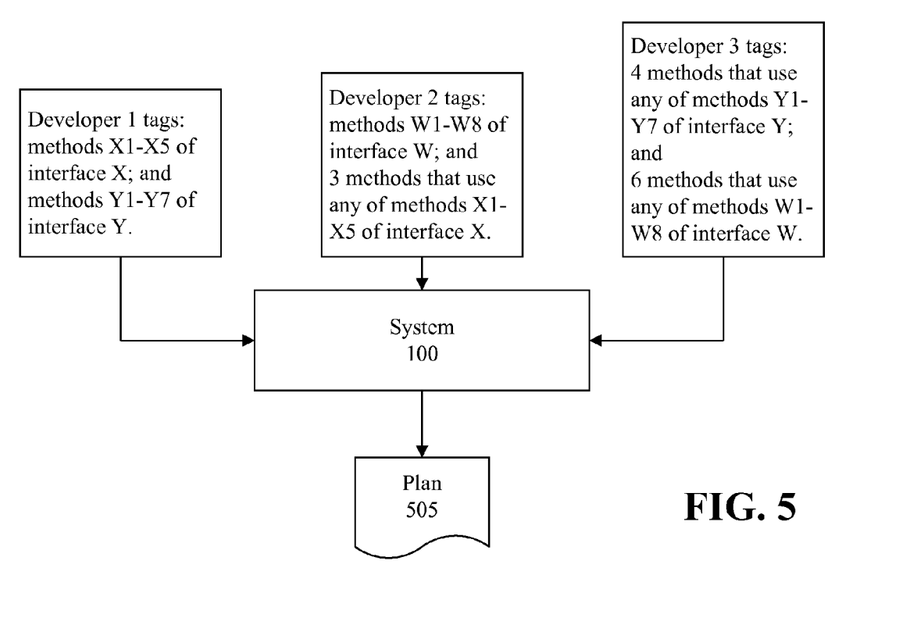
FIG. 5 is a system flow diagram illustrating an exemplary use case in accordance with another embodiment disclosed within this specification.

In the example illustrated in FIGS. 3-5, interfaces can be considered software artifacts and methods can be considered parts thereof. Turning again to FIG. 3, consider the case in which the tags applied by developer 1 are breaking change tags. In that case, the system can automatically determine and tag each method that relies upon methods X1-X5 and Y1-Y10, e.g., each method referenced in the box corresponding to developer 2. An adoption task can be generated for each part of a software artifact that is dependent upon another software artifact that is associated with a breaking task.

Due to the development actions of developer 2, the 7 methods that use any of methods X1-X5 and the 3 methods that utilize any of methods Y1-Y10 also are tagged, e.g., with maintenance change tags. Thus, the methods tagged by developer 2 can be tagged with both breaking change tags and maintenance change tags. Accordingly, a conflict can arise that system 100 can resolve, at least with respect to the overlap relating to the 10 total methods tagged by developer 2 tagged with both types of change tags. In any case, system 100 can determine a sequencing of the tasks that are generated and output the sequencing of tasks as plan 305 as described with reference to FIG. 2.

FIG. 4 is a system flow diagram illustrating an exemplary use case in accordance with another embodiment disclosed within this specification. FIG. 4 illustrates an example of a use case in which multiple producers provide input to system 100 and multiple consumers provide input to system 100. Further, user input overriding one or more weights as determined automatically by system 100 can be provided. It should be appreciated that the various items tagged indicate that the changes to the methods are to be performed in the same iteration of software development, thereby necessitating the generation of plan 405.

As shown, developer 1 tags 5 different methods of interface X. Developer 1 tags methods X1-X5 of interface X. Developer 1 further tags 10 different methods of interface Y. In particular, developer 1 tags methods Y1-Y10 of interface Y. Developer 2 tags 8 different methods of interface W. Developer 2 tags methods W1-W8 of interface W. Developer 2 further tags 6 different methods of interface U. In particular, developer 2 tags methods U1-U6.

Developer 3 tags 4 different methods that utilize any of methods X1-X5 of interface X. Further, developer 3 tags 8 different methods that utilize any of methods U1-U6 of interface U. Developer 4 tags 8 different methods that utilize any of methods W1-W8 of interface W. Developer 4 further tags 4 different methods that utilize any of methods Y1-Y6 of interface Y.

In the example of FIG. 4, developers 1 and 2 can be considered to be applying breaking change tags to the methods indicated in FIG. 4. Developer 3 is applying maintenance change tags to the 12 methods referenced in FIG. 4. Developer 4 is applying maintenance change tags to the 12 methods referenced in FIG. 4. In this example, system 100 can be configured to generate adoption tasks, e.g., for each software artifact dependent upon a method tagged with a breaking change tag, responsive to detecting each breaking change tag. Further, system 100 can be configured to generate a maintenance task responsive to detecting each maintenance change tag.

System 100 also can generate weights for the various tasks to be performed in order to resolve conflicts. As noted, in one aspect, weights can be determined according to the number of tags associated with a given artifact, part, or task correlated thereto. System 100 can use the process described with reference to FIG. 2 to generate plan 405.

In the example of FIG. 4, interface Y has a larger number of tagged methods than interface X. In this case, system 100 can automatically weight interface Y as being of greater importance than interface X in terms of scheduling or sequencing tasks since the number of change tags associated with interface Y outnumber the number of change tags of interface X. Correspondingly, the number of tasks, and in this case adoption tasks, relating to interface Y outnumber the number of tasks relating to interface X. Thus, tasks for interface Y can be scheduled prior to tasks for interface X. Developer 1, however, can change the weight assigned to one or more tasks via input 410. For example, developer 1 can modify or override weights to reflect the developer's judgment of the relative ease of implementing the changes to methods in interface Y compared to the difficulty of implementing the changes to the methods of interface X. System 100 can generate plan 405 according to the modified weights specified by developer 1 through input 410 as opposed to any default or other automated weighting. In this example, by modifying the weights, the developer effectively provides an input requesting a different sequencing of tasks which is performed by the system in response thereto.

FIG. 5 is a system flow diagram illustrating an exemplary use case in accordance with another embodiment disclosed within this specification. FIG. 5 illustrates an example of a use case in which multiple levels of dependencies exist. In this example, developer 1 tags 5 different methods of interface X. Developer 1 tags methods X1-X5 of interface X. Developer 1 further tags 7 different methods of interface Y. In particular, developer 1 tags methods Y1-Y7.

Developer 2 tags 8 different methods of interface W. Developer 2 tags methods W1-W8 of interface W. Developer 2 further tags three different methods that use any of methods X1-X5 of interface X. Developer 3 tags 4 different methods that utilize any of methods Y1-Y7 of interface Y. Further, developer 3 tags 6 different methods that utilize any of methods W1-W8 of interface W.

In this example, developer 1 is applying only breaking change tags. Developer 3 is applying only maintenance change tags. Developer 2, however, is applying both breaking change tags and maintenance change tags. In any case, system 100 can determine a sequence of tasks as illustrated with reference to FIG. 2 and output plan 505.

The one or more embodiments disclosed within this specification can reduce and/or minimize breakages that can occur within software systems when consumers and producers must coordinate software development activities, e.g., tasks. The developers can interact with the system, having developed the plan specifying a sequencing of tasks to be performed.

The flowcharts and block diagrams in the Figures illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A method for task management of shared artifacts, comprising:

detecting a change tag associated with a software artifact;

identifying a plurality of dependent software artifacts that depend upon the software artifact;

generating, for each of the plurality of dependent software artifacts, a task specifying a future modification to the respective dependent software artifact;

determining a responsible party for each of the plurality of dependent software artifacts;

automatically assigning, for all of the generated tasks for the plurality of dependent software artifacts, a task associated with a particular dependent software artifact to a responsible party associated with the particular dependent software artifact;

detecting a dependent software artifact selected from the plurality of dependent software artifacts, wherein the selected dependent software artifact is associated with a plurality of change tags;

identifying conflicting change tags in the plurality of change tags; and determining, by a processor, a sequence of tasks, generated for the selected dependent software artifact and from the plurality of change tags, based upon priority rules for the sequence of tasks corresponding to the identified conflicting change tags.

2. The method of claim 1, wherein
the generating includes determining a sequence of the generated tasks for the plurality of dependent software artifacts.

3. The method of claim 2, wherein
the sequence of the generated tasks is based upon a number of change tags associated with each of the plurality of dependent software artifacts.

4. The method of claim 3, wherein
a plurality of dependent software artifacts associated with a greater number of change tags are scheduled earlier in the sequence of the generated tasks than a plurality of dependent software artifacts associated with a lesser number of change tags.

5. The method of claim 3, wherein
the sequence of the generated tasks is overridden responsive to a user input requesting a different prioritization.

6. The method of claim 1, wherein
a first task, generated for the selected dependent software artifact, is associated with a first change tag of a first type, and
a second task, generated for the selected dependent software artifact, is associated with a second change tag of a second type.

7. The method of claim 6, wherein
the priority rules are applied based upon at least one of the plurality of change tags being a breaking type change tag.

8. The method of claim 1, further comprising:
identifying at least two tasks associated with a same software artifact; and
merging the at least two tasks.

9. The method of claim 8, wherein
the at least two tasks are merged based upon a determination that the at least two tasks are a same type of task.

10. The method of claim 1, wherein
tasks generated from maintenance type change tags are prioritized higher in the sequence of tasks than tasks generated from breaking type change tags.

11. The method of claim 1, further comprising:
generating a first plurality of tasks;
distinguishing between breaking type change tags and maintenance type change tags; and
identifying a second plurality of tasks associated with a same software artifact, wherein the second plurality of tasks is a subset of the first plurality of tasks.

12. A computer hardware system configured for task management of shared artifacts, comprising:
at least one processor, wherein the at least one processor is configured to initiate and/or perform:
detecting a change tag associated with a software artifact;
identifying a plurality of dependent software artifacts that depend upon the software artifact;
generating, for each of the plurality of dependent software artifacts, a task specifying a future modification to the respective dependent software artifact;
determining a responsible party for each of the plurality of dependent software artifacts;
automatically assigning, for all of the generated tasks for the plurality of dependent software artifacts, a task associated with a particular dependent software artifact to a responsible party associated with the particular dependent software artifact;
detecting a dependent software artifact selected from the plurality of dependent software artifacts, wherein the selected dependent software artifact is associated with a plurality of change tags;
identifying conflicting change tags in the plurality of change tags; and
determining a sequence of tasks, generated for the selected dependent software artifact and from the plurality of change tags, based upon priority rules for the sequence of tasks corresponding to the identified conflicting change tags.

13. The computer hardware system of claim 12, wherein
the generating includes determining a sequence of the generated tasks for the plurality of dependent software artifacts.

14. The computer hardware system of claim 13, wherein
the sequence of the generated tasks is based upon a number of change tags associated with each of the plurality of dependent software artifacts.

15. The computer hardware system of claim 14, wherein
a plurality of dependent software artifacts associated with a greater number of change tags are scheduled earlier in the sequence of the generated tasks than a plurality of dependent software artifacts associated with a lesser number of change tags.

16. The computer hardware system of claim 14, wherein
the sequence of the generated tasks is overridden responsive to a user input requesting a different prioritization.

17. The computer hardware system of claim 12, wherein
a first task, generated for the selected dependent software artifact, is associated with a first change tag of a first type, and
a second task, generated for the selected dependent software artifact, is associated with a second change tag of a second type.

18. The computer hardware system of claim 17, wherein
the priority rules are applied based upon at least one of the plurality of change tags being a breaking type change tag.

19. A computer program product, comprising:
a computer usable storage medium having stored therein computer usable program code for task management of shared artifacts, the computer usable program code, which when executed by a computer hardware system, causes the computer hardware system to perform:
detecting a change tag associated with a software artifact;
identifying a plurality of dependent software artifacts that depend upon the software artifact;
generating, for each of the plurality of dependent software artifacts, a task specifying a future modification to the respective dependent software artifact;
determining a responsible party for each of the plurality of dependent software artifacts;
automatically assigning, for all of the generated tasks for the plurality of dependent software artifacts, a task associated with a particular dependent software artifact to a responsible party associated with the particular dependent software artifact;
detecting a dependent software artifact selected from the plurality of dependent software artifacts, wherein the selected dependent software artifact is associated with a plurality of change tags;
identifying conflicting change tags in the plurality of change tags; and
determining a sequence of tasks, generated for the selected dependent software artifact and from the plurality of change tags, based upon priority rules for the sequence of tasks corresponding to the identified conflicting change tags, wherein the computer usable storage medium does not consist of transitory, propagating signals.

20. The computer program product of claim 19, wherein
the generating includes determining a sequence of the generated tasks for the plurality of dependent software artifacts.

21. The computer program product of claim 20, wherein the sequence of the generated tasks is based upon a number of change tags associated with each of the plurality of dependent software artifacts.

22. The computer program product of claim 21, wherein a plurality of dependent software artifacts associated with a greater number of change tags are scheduled earlier in the sequence of the generated tasks than a plurality of dependent software artifacts associated with a lesser number of change tags.

23. The computer program product of claim 21, wherein the sequence of the generated tasks is overridden responsive to a user input requesting a different prioritization.

24. The computer program product of claim 19, wherein a first task, generated for the selected dependent software artifact, is associated with a first change tag of a first type, and a second task, generated for the selected dependent software artifact, is associated with a second change tag of a second type.

25. The computer program product of claim 24, wherein the priority rules are applied based upon at least one of the plurality of change tags being a breaking type change tag.

* * * * *